US010269170B2

United States Patent
Austin et al.

(10) Patent No.: US 10,269,170 B2
(45) Date of Patent: Apr. 23, 2019

(54) THREE DIMENSIONAL SURFACE REPRESENTATION FOR MODELING GEOLOGICAL SURFACES

(71) Applicants: Samuel Austin, The Hague (NL); Marijn Loomans, Rijswijk (NL); Evgeny Voronkin, Amsterdam (NL); Andriy Bun, The Hague (NL)

(72) Inventors: Samuel Austin, The Hague (NL); Marijn Loomans, Rijswijk (NL); Evgeny Voronkin, Amsterdam (NL); Andriy Bun, The Hague (NL)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/582,411

(22) Filed: Apr. 28, 2017

(65) Prior Publication Data

US 2018/0315242 A1 Nov. 1, 2018

(51) Int. Cl.
G06T 17/00 (2006.01)
G06T 15/06 (2011.01)
G01V 99/00 (2009.01)

(52) U.S. Cl.
CPC .............. *G06T 15/06* (2013.01); *G01V 99/00* (2013.01)

(58) Field of Classification Search
CPC ........................................... G06T 17/00–17/30
USPC ....................................................... 345/420
See application file for complete search history.

(56) References Cited

U.S. PATENT DOCUMENTS

| 5,844,564 | A | * | 12/1998 | Bennis | G06T 17/20 345/423 |
|---|---|---|---|---|---|
| 8,059,122 | B1 | * | 11/2011 | MacGillivray | G06T 15/06 345/424 |
| 9,366,121 | B2 | * | 6/2016 | Copeland | E21B 43/26 |
| 2003/0112235 | A1 | * | 6/2003 | Grace | G06T 17/20 345/419 |
| 2005/0219245 | A1 | * | 10/2005 | Tao | G06T 17/20 345/424 |
| 2006/0243490 | A1 | * | 11/2006 | Riel | E21B 7/04 175/62 |
| 2007/0058455 | A1 | * | 3/2007 | Usami | G06F 17/5018 365/189.07 |
| 2011/0074766 | A1 | * | 3/2011 | Page | G06T 11/203 345/419 |

(Continued)

*Primary Examiner* — Phong X Nguyen
(74) *Attorney, Agent, or Firm* — Cantor Colburn LLP (57) ABSTRACT

Examples of techniques for three-dimensional (3D) surface representation are disclosed. In one example implementation according to aspects of the present disclosure, a computer-implemented method includes receiving a triangle mesh surface representation of a surface of an earth formation. The method further includes defining a 3D grid over the triangle mesh surface representation. The 3D grid includes cells defined by edges. The method further includes identifying points of intersection as nodes that are situated on the edges. The method further includes connecting the nodes. The method further includes generating a fully connected surface representation of the surface of the earth formation based at least in part on the nodes and connections between the nodes. The method further includes controlling equipment based at least in part on the fully connected surface representation of the surface of the earth formation.

14 Claims, 10 Drawing Sheets

(56) References Cited

U.S. PATENT DOCUMENTS

| | | | |
|---|---|---|---|
| 2011/0125476 A1* | 5/2011 | Craig | E21B 43/16 703/10 |
| 2011/0310101 A1* | 12/2011 | Prange | G01V 99/00 345/420 |
| 2012/0265510 A1* | 10/2012 | Lepage | G01V 99/005 703/9 |
| 2014/0052427 A1* | 2/2014 | Yahiaoui | G06T 17/05 703/10 |
| 2014/0176545 A1* | 6/2014 | Laine | G06T 11/40 345/424 |
| 2014/0350897 A1* | 11/2014 | Hobro | G01V 1/302 703/1 |
| 2015/0212231 A1* | 7/2015 | Borouchaki | G06T 17/20 703/10 |
| 2016/0124117 A1* | 5/2016 | Huang | G06T 17/05 703/2 |
| 2017/0357736 A1* | 12/2017 | Schmitter | G06F 17/11 |
| 2018/0031719 A1* | 2/2018 | Huang | G01V 1/48 |

\* cited by examiner

THREE DIMENSIONAL SURFACE REPRESENTATION FOR MODELING GEOLOGICAL SURFACES

BACKGROUND

The present disclosure relates generally to surface representation for modeling geological surfaces and more particularly to three-dimensional (3D) surface representation for modeling geological surfaces.

Mathematical models of geological formations have many uses for hydrocarbon production. Formation models may include both rock fractures and faults and distinct transitions between different deposited rock formations that can contribute to the flow and containment of hydrocarbons and thus provide an estimate of an amount of producible hydrocarbons. Once the amount is estimated, further steps may be taken such as determining the economic feasibility of production from the formation and a suitable location of a well. Other factors may also be determined from the formation model such as stress at each of the fractures and subsidence of formation rock and likelihood of an earthquake after extraction. The accuracy of corresponding estimations and determinations depends on the accuracy of the formation model. Hence, improvement in the accuracy of formation models would be well received in the drilling and production industries.

BRIEF SUMMARY

Embodiments of the invention described herein provide systems and methods for three-dimensional (3D) surface representation. In one embodiment, a computer-implemented method includes receiving a triangle mesh surface representation of a surface of an earth formation. The method further includes defining a 3D grid over the triangle mesh surface representation. The 3D grid includes cells defined by edges. The method further includes identifying points of intersection as nodes that are situated on the edges. The method further includes connecting the nodes. The method further includes generating a fully connected surface representation of the surface of the earth formation based at least in part on the nodes and connections between the nodes. The method further includes controlling equipment based at least in part on the fully connected surface representation of the surface of the earth formation.

In another embodiment, a system includes drilling equipment, a memory comprising computer readable instruction, and a processing device for executing the computer readable instructions for performing a method. The method includes receiving, by the processing device, a triangle mesh surface representation of a surface of an earth formation. The method further includes defining, by the processing device, a 3D grid over the triangle mesh surface representation. The 3D grid includes cells defined by edges. The method further includes identifying, by the processing device, points of intersection as nodes that are situated on the edges. The method further includes, based at least in part on two nodes being identified as being identified as situated on an edge of a first cell, connecting, by the processing device, the two nodes. The method further includes, based at least in part on more than two nodes being identified as situated on an edge of a second cell, connecting, by the processing device, the more than two nodes by tracing the surface representation to determine an order in which to connect the more than two nodes. The method further includes generating, by the processing device, a fully connected surface representation of the surface of the earth formation based at least in part on the nodes and connections between the nodes. The method further includes controlling, by the processing device, the drilling equipment based at least in part on the fully connected surface representation of the surface of the earth formation.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

A detailed description of one or more embodiments of the disclosed apparatus and method presented herein by way of exemplification and not limitation with reference to the figures. Disclosed is a method implemented by a processor for representing a surface of an earth formation in three-dimensional space as a fully connected surface representation of the earth formation. The surface may represent a fault boundary, a horizon, an unconformity, an intrusion, and/or other features of interest.

According to examples described herein, an existing triangle mesh and dimensions of a 3D grid having cells are used to first resample points on the existing triangle mesh and then connect the resampled points. The created connections represent the original surface of the earth formation as closely as possible while providing a regular pattern. Many of the resampled points lie on edges of the 3D grid cells, and the boundary includes points that may also lie on faces of the 3D grid cells. The resampled points are connected to each other along faces of the 3D grid cells, except for the boundary points, where the connections may pass through the grid cells.

Existing representation techniques provide badly triangulated surfaces, are not necessarily watertight, and cannot model complex geometries, such as salt domes, overhangs, etc. The present techniques provide for the representation of a surface where the nodes are situated on the edges or faces of the 3D grid cells, which enables easier creation of a 3D grid from meshes within this structure. The structure presented herein provides for regular sampling, adhering to the original shape of the earth formation as closely as possible, and adheres to the original connectivity. In addition, the proposed structure represent complex shapes that have multiple points in a row as seen from a particular projection direction (e.g., axis) and does not require a boundary. Examples of complex surfaces include, but are not limited to, salt domes, overhangs, spheres, etc. Other services that relate to various geological features may also be represented such as: rock boundaries, rock fractures (faults), depositional transitions (horizons), erosion events (unconformities), or similar geological features. The present techniques can be used to create watertight models from multiple representations that share the same 3D grid dimensions. These watertight models are beneficial for various further modeling steps. Moreover, the present techniques provide improved triangulation by removing excess nodes that can cause small triangles.

The present techniques improve the accuracy of representing the boundary and, thus, improve the accuracy of further processing to estimate or determine various factors related to the formation such as permeability. The various factors in turn may be used to perform an action related to the earth formation such as determining a location for drilling a borehole, drilling a borehole at the determined location with a specific geometry, or extracting hydrocarbons according to a production process.

Figure 1:
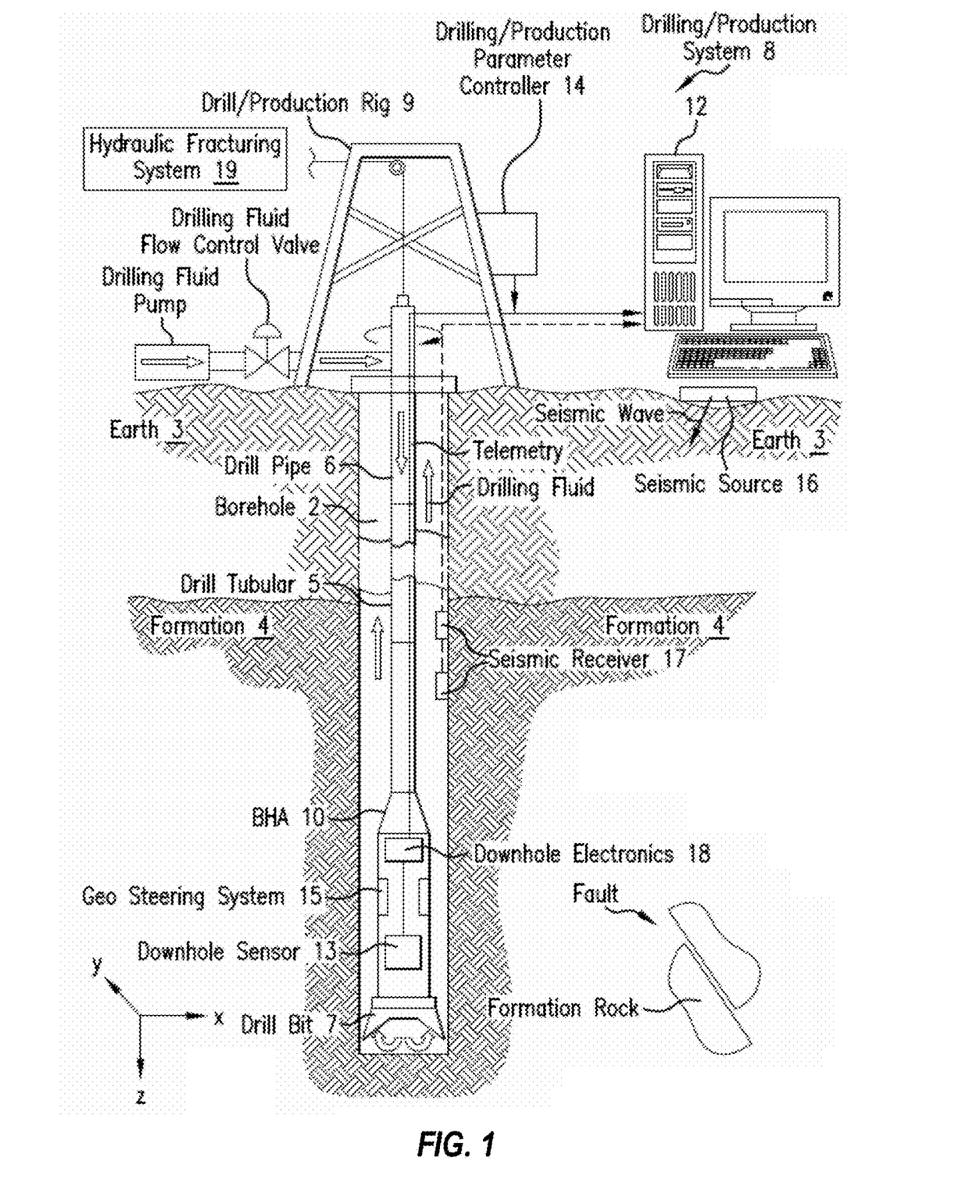
FIG. 1 depicts a cross-sectional view of a borehole penetrating the earth, which includes a formation 4, according to embodiments of the present invention.

Apparatus for implementing the disclosure and features related to the disclosure is now discussed. FIG. 1 depicts a cross-sectional view of a borehole 2 penetrating the earth 3, which includes a formation 4, according to embodiments of the present invention. The formation 4 includes formation rock that has faults or fractures. A seismic source 16 is configured to emit a seismic wave that travels through the formation 4 and is received by seismic receivers 17. Data from the seismic receivers is processed by a processing system 12 to provide a tri-mesh representation of the surfaces of the formation rock to include faults and how the faults are interconnected. The tri-mesh representation geometry includes a boundary.

A drilling/production system 8 includes a drill/production rig 9 that is configured to drill the borehole 2 and/or extract hydrocarbons from the formation 4 via the borehole 2. A drill bit 7 is disposed at the distal end of a drill tubular 5 for drilling the borehole 2. The drill tubular 5 may be a drill string made up of a plurality of connected drill pipes 6. Drilling fluid or mud is pumped through the drill tubular 5 to lubricate the drill bit 7 and flush cuttings from the borehole 2. The drilling fluid is pumped by a drilling fluid pump and a flow rate of the drill fluid is controlled by a drilling fluid control valve. The drilling fluid pump and flow control valve may be controlled by a drilling/production parameter controller 14 to maintain a suitable pressure and flow rate to prevent the borehole 2 from collapsing.

Suitable drilling fluid pressure and flow parameters may be determined by knowing the stresses of the formation rock, which can be determined from representation of the surfaces of the formation rock. The drilling/production parameter controller 14 is configured to control, such as by feedback control for example, parameters used to drill the borehole 2 and/or extract hydrocarbons via the borehole 2. Suitable flow rate for extraction may be determined from knowing the porosity of the formation rock, which can be determined from representation of the surfaces of the formation rock.

The drill tubular 5 includes a bottomhole assembly (BHA) 10. The BHA 10 includes a downhole sensor 13 configured for sensing various downhole properties or parameters related to the formation 4, the borehole 2, and/or position of the BHA 10. Sensor data may be transmitted to the surface by telemetry for processing such as by the processing system 12. The BHA 10 may also include a geo-steering system 15. The geo-steering system 15 is configured to steer the drill bit 7 in order to drill the borehole 2 according to a selected path or geometry. The path or geometry in general is selected to optimize hydrocarbon production from the borehole 2 and to ensure that the stress on the formation due to the borehole along the path does not exceed the strength of the formation material. The optimized geometry may be determined from representation of the surfaces of the formation rock.

Steering commands may be transmitted from the drilling/production parameter controller 14 to the geo-steering system 15 by the telemetry. Telemetry in one or more embodiments may include mud-pulse telemetry or wired drill pipe. Downhole electronics 18 may process data downhole and/or act as an interface with the telemetry. FIG. 1 also illustrates a hydraulic fracturing system 19 that is configured to fracture rock of the formation 4 by pumping fracturing fluid at high pressure into the borehole 2.

Figure 2:
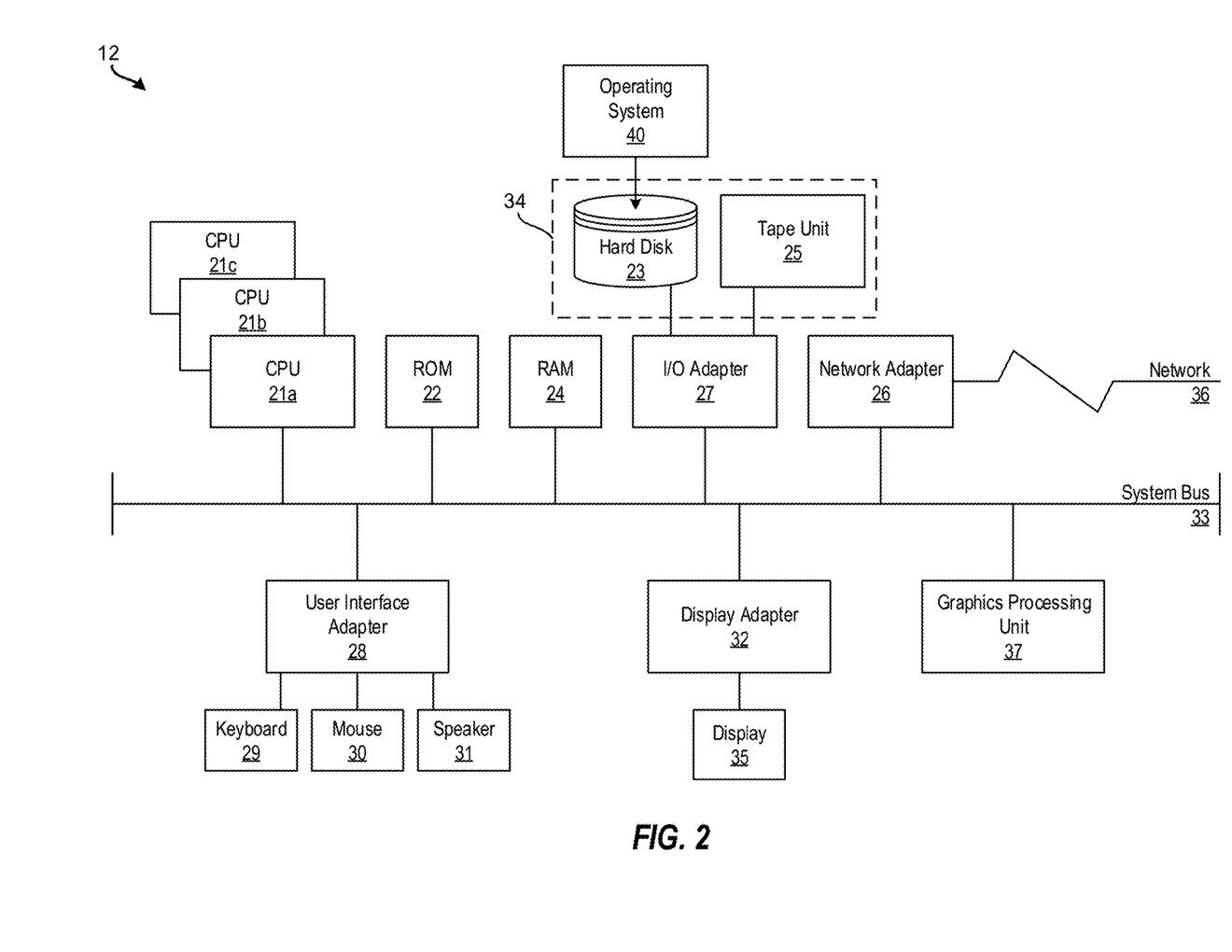
FIG. 2 depicts a block diagram of a processing system for implementing the techniques described herein, according to embodiments of the present invention.

It is understood that embodiments of the present invention are capable of being implemented in conjunction with any other suitable type of computing environment now known or later developed. For example, FIG. 2 depicts a block diagram of the processing system 12 of FIG. 1, which can be used for implementing the techniques described herein. In examples, processing system 12 has one or more central processing units (processors) 21*a*, 21*b*, 21*c*, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 12.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 12 may be stored in mass storage 34. A network adapter 26 interconnects system bus 33 with an outside network 36 enabling processing system 12 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 12 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 12 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system to coordinate the functions of the various components shown in processing system 12.

Figure 3:
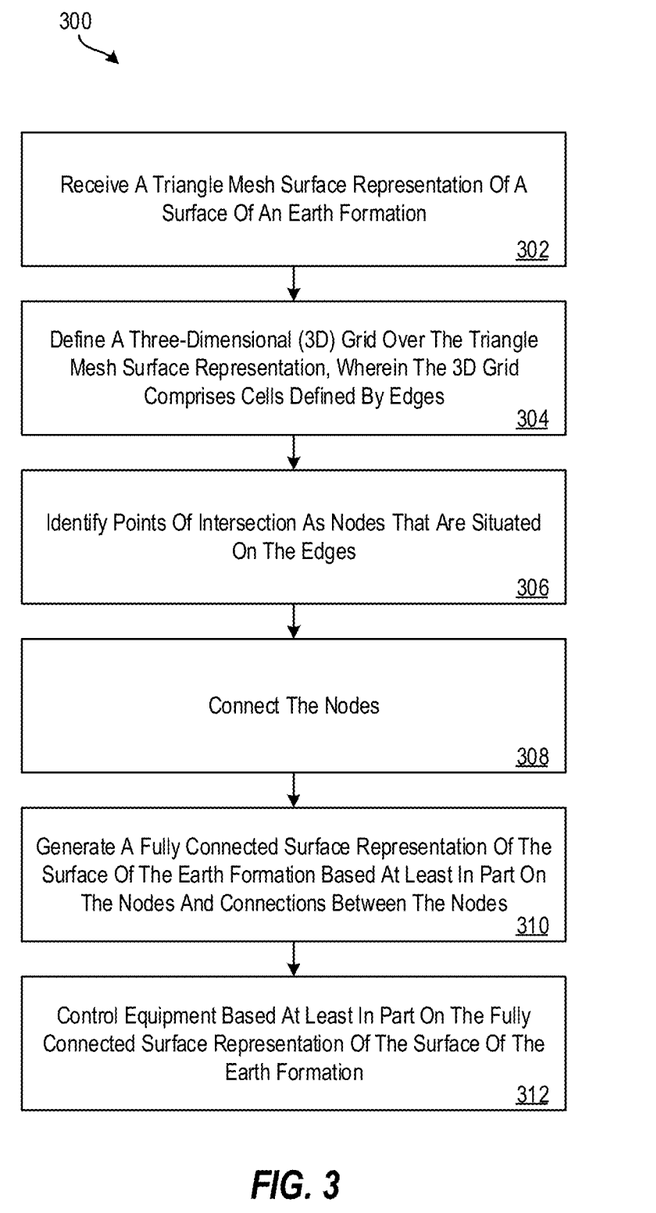
FIG. 3 depicts a flow diagram of a method 300 for 3D surface representation, according to embodiments of the present invention.

FIG. 3 depicts a flow diagram of a method 300 for 3D surface representation, according to embodiments of the present invention. The method 300 can be implemented using a processing system, such as the processing system 12 of FIGS. 1 and 2, or another suitable processing system.

Figure 4A:
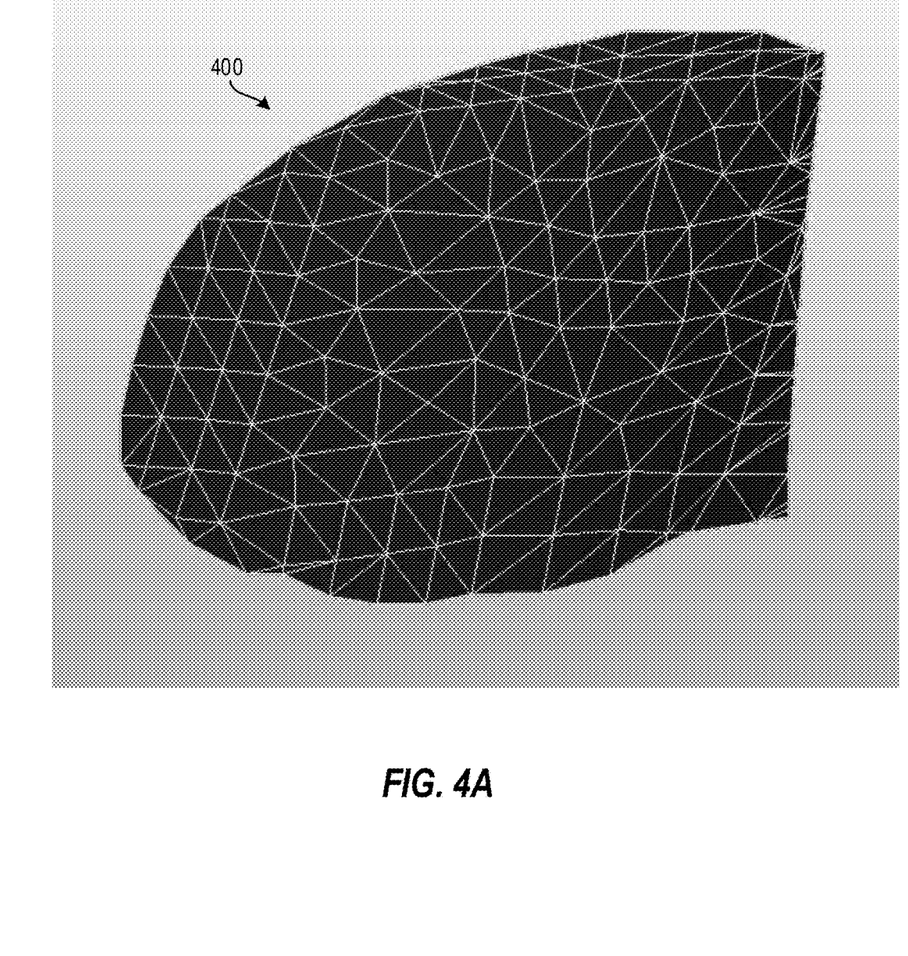
FIG. 4A depicts a triangulation mesh surface representation, according to embodiments of the present invention.

At block 302 of FIG. 3, the processing system (e.g., the processing system 12) receives a triangulation mesh surface representation of a surface of an earth formation. FIG. 4A depicts a triangulation mesh surface representation 400.

Figure 4B:
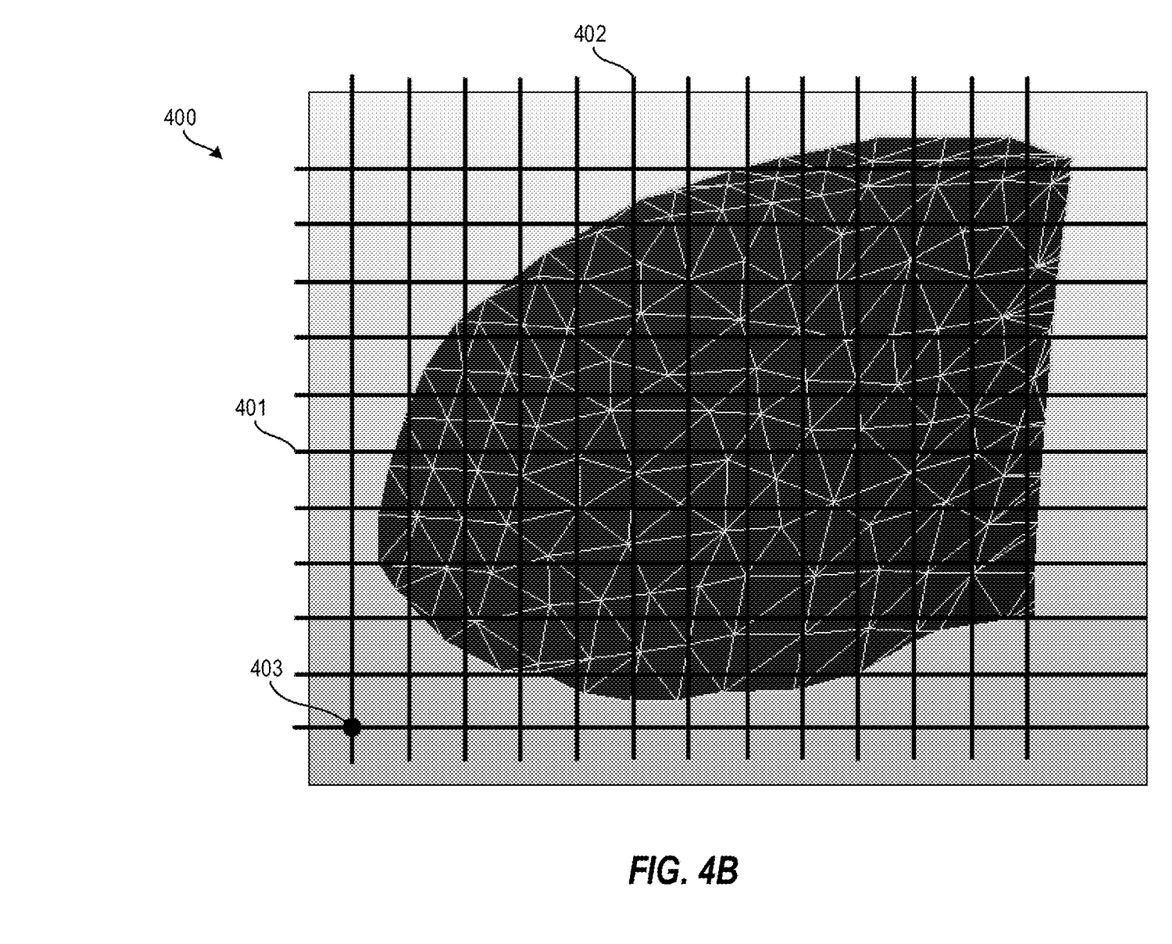
FIG. 4B depicts a 3D grid made of up grid lines along an x, y, and z-axes to form cells according to embodiments of the present invention.
Figure 4C:
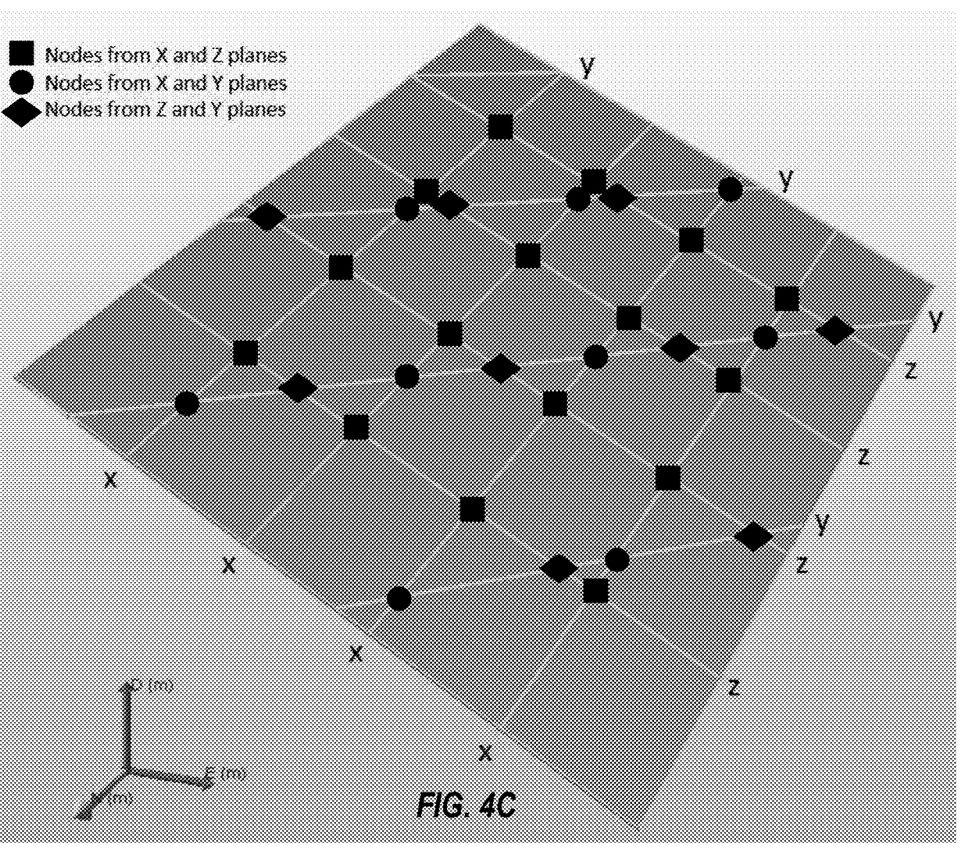
FIG. 4C depicts a 3D view of a portion of a grid, according to embodiments of the present invention.

At block 304 of FIG. 3, the processing system defines a 3D grid over the triangle mesh surface representation, wherein the 3D grid comprises cells defined by edges. FIG. 4B depicts a 3D grid made of up grid lines 401 along an x-axis, grid lines 402 along a y-axis, and grid lines (not shown) along a z-axis to form cells. The grid lines define the grid, which originates at an origin 403. Each cell of the grid is one "unit" in length. For example, each unit can represent 100 meters or another suitable length. The distance between the planes does not necessarily have to be the same in each dimension. For example, unit lengths can vary along one dimension or multiple dimensions. In another example, the present techniques support the option of rotating the entire grid by some azimuth. FIG. 4C depicts a 3D view 406 of a portion of a grid (e.g., the grid of FIG. 4B). The grid is made up of x planes, y planes, and z planes. In particular, FIG. 4C depicts how the regular nodes within the structure are formed (based on the intersection between two planes). Accordingly, FIG. 4C depicts the supposed intersection lines of the planes with a surface and the nodes that are created where the intersection lines intersect each other.

Figure 4D:
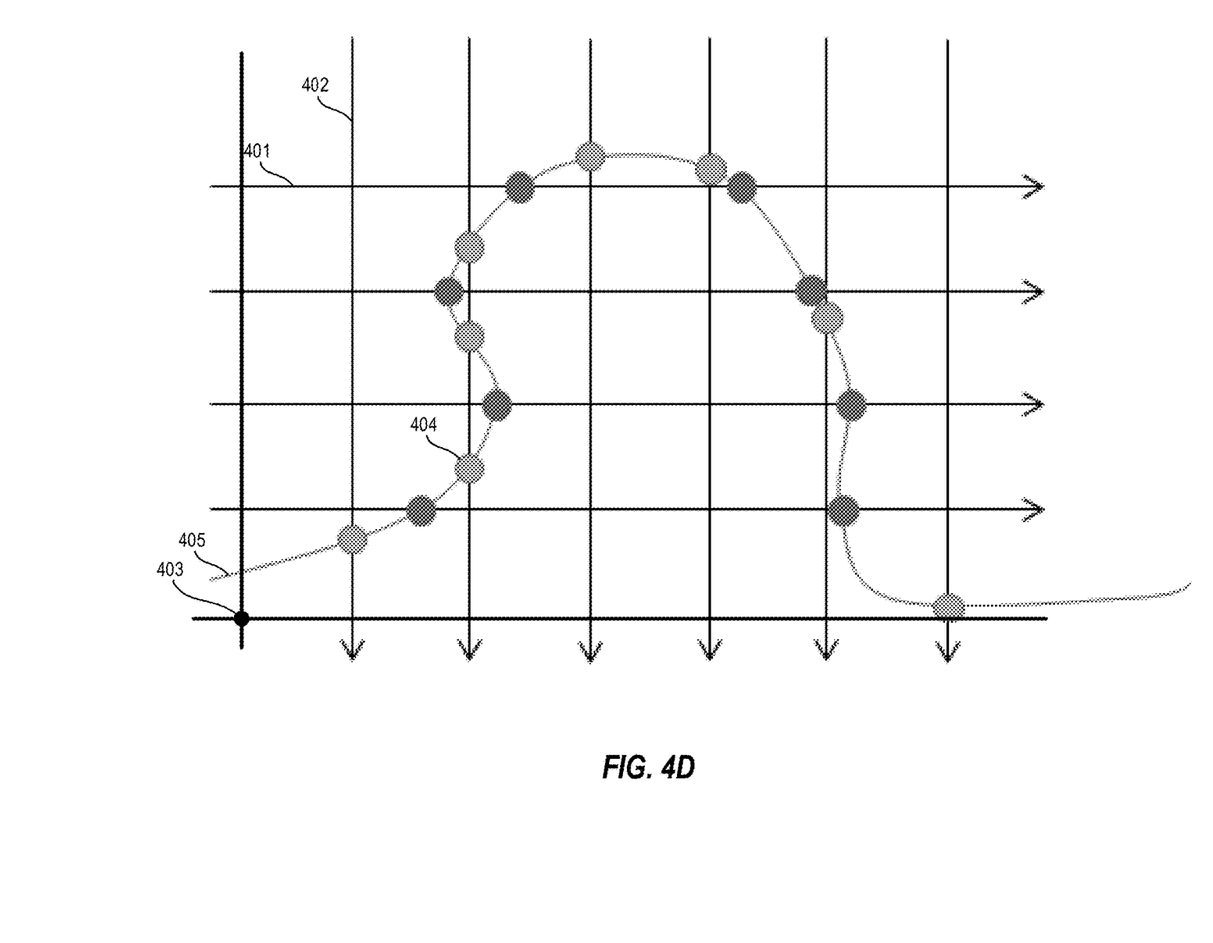
FIG. 4D depicts nodes along a surface, according to embodiments of the present invention.

At block 306 of FIG. 3, the processing system identifies points of intersection as nodes that are situated on the grid edges. Identifying points of intersection as nodes (i.e., identifying nodes) can be performed, for example, using ray casting. FIG. 4D depicts nodes 404 (represented as circles/dots) along a surface 405. The nodes are points of intersection where the surface crosses grid lines or edges of the cells. Each node includes coordinates defined as (x-axis coordinate, y-axis coordinate, z-axis coordinate) that indicate where in the grid that the node is situated with respect to the origin 403.

Figure 5A:
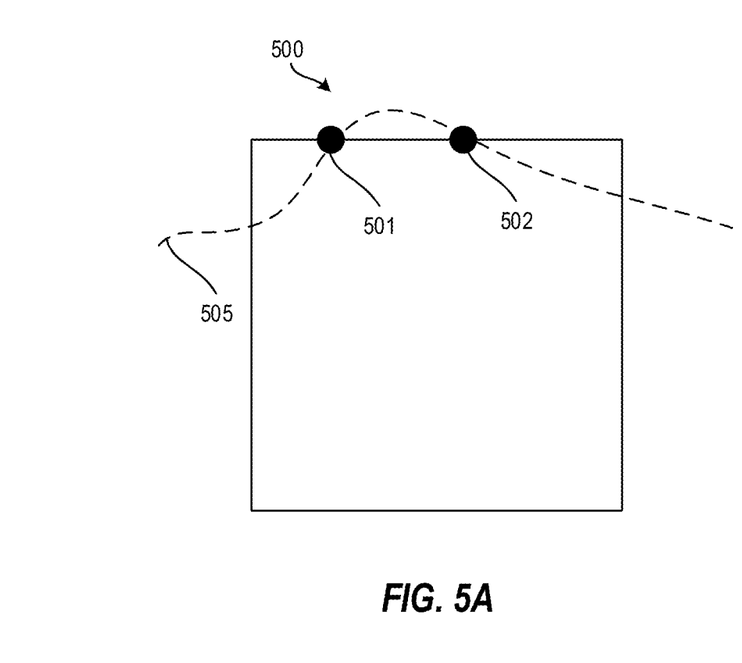
FIG. 5A depicts two nodes along an edge of a cell, according to embodiments of the present invention.

At block 308 of FIG. 3, the processing system connects the nodes. Connecting the nodes depends, at least in part, on how many nodes are identified as being situated on an edge of a cell. For example, if two nodes are identified as being situated on an edge of a cell as depicted in FIG. 5A, then the two nodes are known to be adjacent and are therefore connected. For examples, nodes 501 and 502 are situated on an edge of the cell 500. The nodes 501, 502 are known to be adjacent along the surface 505.

Figure 5B:
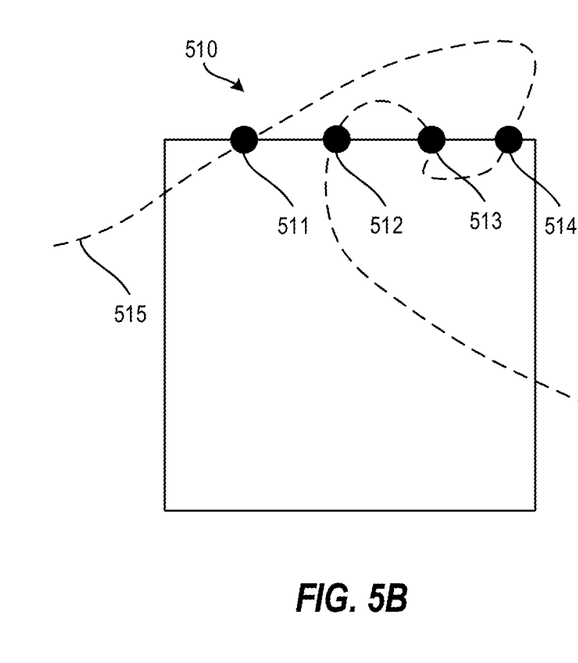
FIG. 5B depicts more than two nodes along an edge of a cell, according to embodiments of the present invention.

However, if more than two nodes are identified as being situated on an edge of a cell as depicted in FIG. 5B, it is unknown in what order the more than two nodes should be connected. In this case, the nodes are connected by tracing the surface representation (e.g., the surface 405) to determine in what order to connect the nodes. For example, nodes 511, 512, 513, 514 are all situated on an edge of the cell 510. As depicted in FIG. 5, the nodes 511-514 are not adjacent in terms of the order in which the surface 515 passes through the nodes (i.e., points along the edge of the cell 510). To determine the adjacent of the nodes 511-514, the topology of the source surface (e.g., the surface 515) is used to determine how to connect the nodes 511-514.

Figure 6A:
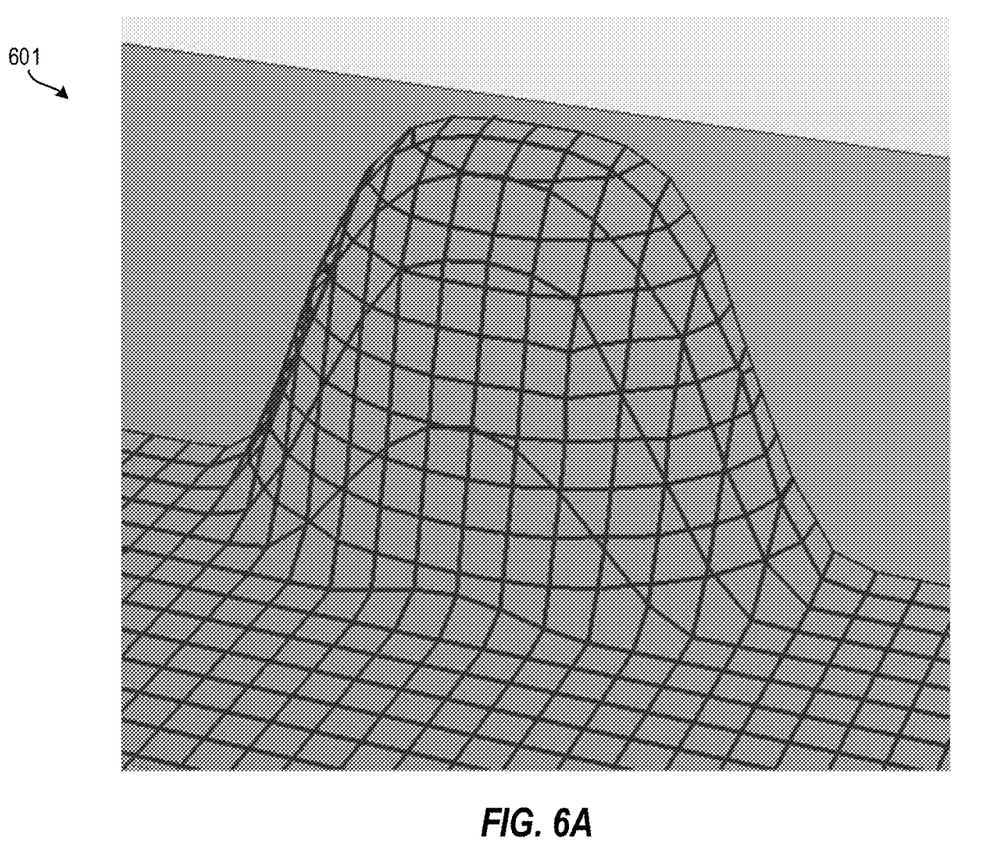
FIG. 6A depicts an example of a fully connected surface representation of the surface of the earth formation, according to embodiments of the present invention.
Figure 6B:
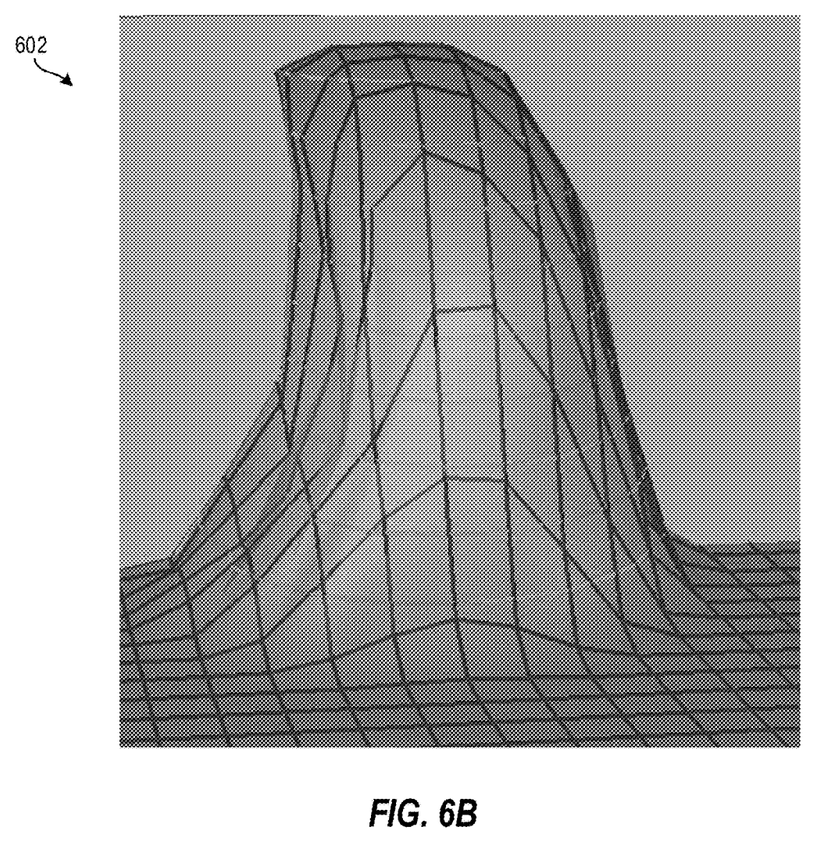
FIG. 6B depicts an example of a fully connected surface representation of the surface of the earth formation, according to embodiments of the present invention.

At block 310 of FIG. 3, the processing system generates a fully connected surface representation of the surface of the earth formation based at least in part on the nodes and connections between the nodes. FIG. 6A depicts an example of a fully connected surface representation 601 of the surface of the earth formation that is generated based on the nodes and connections between the nodes. FIG. 6B depicts another example of a fully connected surface representation 602 of the surface of the earth formation that is generated based on the nodes and connections between the nodes. The fully connected surface representations represent the original surface as closely as possible while providing a regular pattern.

At block 312 of FIG. 3, the processing system controls equipment based at least in part on the fully connected surface representation of the surface of the earth formation. The fully connected surface representation (e.g., the fully connected surface representations 601, 602) is useful to control drilling/production systems (e.g. the drilling/production system 8). In particular, the present techniques can produce representations of complex shapes that have multiple points in arrow as viewed from a projection direction. This may be particularly useful to represent salt domes, overhangs, spheres, etc. The fully connected surface representations can be "watertight" models that are highly beneficial for various further modeling and/or drilling/production.

The drilling/production system 8 can be used to control drilling equipment (e.g., drilling/production rig 9) for drilling the borehole 2 into the earth formation 4. Similarly, the drilling/production system 8 can be used to control a hydraulic fracturing system 19 for fracturing rock in the earth formation 4. The drilling/production system 8 can also be used to control the drill/production rig 9 to produce hydrocarbons from the each formation 4.

Additional processes also may be included, and it should be understood that the processes depicted in FIG. 3 represent illustrations, and that other processes may be added or existing processes may be removed, modified, or rearranged without departing from the scope and spirit of the present disclosure.

Embodiment 1

A computer-implemented method for three-dimensional (3D) surface representation, the method comprising: receiving, by a processing device, a triangle mesh surface representation of a surface of an earth formation; defining, by the processing device, a 3D grid over the triangle mesh surface representation, wherein the 3D grid comprises cells defined by edges; identifying, by the processing device, points of intersection as nodes that are situated on the edges; connecting, by the processing device, the nodes; generating, by the processing device, a fully connected surface representation of the surface of the earth formation based at least in part on the nodes and connections between the nodes; and controlling, by the processing device, equipment based at least in part on the fully connected surface representation of the surface of the earth formation.

Embodiment 2

The computer-implemented of any prior embodiment, wherein identifying the points of intersection is performed by ray casting.

Embodiment 3

The computer-implemented of any prior embodiment, wherein connecting the nodes further comprises: based at least in part on two nodes being identified as being identified as situated on a face of a first cell, connecting, by the processing device, the two nodes.

Embodiment 4

The computer-implemented of any prior embodiment, wherein connecting the nodes further comprises: based at least in part on more than two nodes being identified as situated on a face of a second cell, connecting, by the processing device, the more than two nodes by tracing the surface representation to determine an order in which to connect the more than two nodes.

Embodiment 5

The computer-implemented of any prior embodiment, wherein controlling equipment comprises controlling drilling equipment for drilling a borehole into the earth formation.

Embodiment 6

The computer-implemented of any prior embodiment, wherein controlling equipment comprises controlling a hydraulic fracturing system for fracturing rock in the earth formation.

Embodiment 7

The computer-implemented of any prior embodiment, wherein controlling equipment comprises controlling a production rig for producing hydrocarbons from the earth formation.

Embodiment 8

The computer-implemented of any prior embodiment, wherein the 3D grid comprises a plurality of 3D cells, and wherein each node comprises a coordinate indicating a relationship of the node with respect to one of the plurality of 3D cells.

Embodiment 9

The computer-implemented of any prior embodiment, wherein the coordinate comprises an x-axis coordinate, a y-axis coordinate, and a z-axis coordinate.

Embodiment 10

The computer-implemented of any prior embodiment, wherein the fully connected surface representation represents at least a plurality of points in a row along a projection direction.

Embodiment 11

The computer-implemented of any prior embodiment, wherein the fully connected surface representation is connected to another fully connected surface to form a water tight structural model.

Embodiment 12

A system for three-dimensional (3D) surface representation, the system comprising: drilling equipment; a memory comprising computer readable instructions; and a processing device for executing the computer readable instructions for performing a method, the method comprising: receiving, by the processing device, a triangle mesh surface representation of a surface of an earth formation; defining, by the processing device, a 3D grid over the triangle mesh surface representation, wherein the 3D grid comprises cells defined by edges; identifying, by the processing device, points of intersection as nodes that are situated on the edges; based at least in part on two nodes being identified as being identified as situated on an edge of a first cell, connecting, by the processing device, the two nodes; based at least in part on more than two nodes being identified as situated on an edge of a second cell, connecting, by the processing device, the more than two nodes by tracing the surface representation to determine an order in which to connect the more than two nodes; generating, by the processing device, a fully connected surface representation of the surface of the earth formation based at least in part on the nodes and connections between the nodes; and controlling, by the processing device, the drilling equipment based at least in part on the fully connected surface representation of the surface of the earth formation.

Embodiment 13

The system of any prior embodiment, wherein identifying the points of intersection is performed by ray casting.

Embodiment 14

The system of any prior embodiment, wherein the 3D grid comprises a plurality of 3D cells, and wherein each node comprises a coordinate indicating a relationship of the node with respect to one of the plurality of 3D cells, wherein the coordinate comprises an x-axis coordinate, a y-axis coordinate, and a z-axis coordinate.

Embodiment 15

The system of any prior embodiment, wherein the fully connected surface representation represents at least a plurality of points in a row along a projection direction.

In support of the teachings herein, various analysis components may be used, including a digital and/or an analog system. For example, the computer processing system 12, the downhole sensor 13, the drilling/production parameter controller 14, the geo-steering system 15, the seismic source 16, the seismic receiver 17, the downhole electronics 18, and/or the telemetry may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "coupled" relates to a first component being coupled to a second component either directly or indirectly via an intermediary component. The term "configured" relates to one or more structural limitations of a device that are required for the device to perform the function or operation for which the device is configured.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A computer-implemented method for three-dimensional (38D) surface representation, the method comprising:
    receiving, by a processing device, a triangle mesh surface representation of a surface of an earth formation;
    defining, by the processing device, a 3D grid over the triangle mesh surface representation, wherein the 3D grid comprises cells defined by edges;
    identifying, by the processing device, points of intersection as nodes that are situated on the edges;
    connecting, by the processing device, the nodes, wherein connecting the nodes further comprises, based at least in part on more than two nodes being identified as situated on a face of a first cell, connecting, by the processing device, the more than two nodes by tracing a topology of the surface representation to determine an order in which to connect the more than two nodes;
    generating, by the processing device, a fully connected surface representation of the surface of the earth formation based at least in part on the nodes and connections between the nodes; and
    controlling, by the processing device, equipment based at least in part on the fully connected surface representation of the surface of the earth formation.

2. The computer-implemented method of claim 1, wherein identifying the points of intersection is performed by ray casting.

3. The computer-implemented method of claim 1, wherein connecting the nodes further comprises:
    based at least in part on two nodes being identified as situated on a face of a second cell, connecting, by the processing device, the two nodes.

4. The computer-implemented method of claim 1, wherein controlling equipment comprises controlling drilling equipment for drilling a borehole into the earth formation.

5. The computer-implemented method of claim 1, wherein controlling equipment comprises controlling a hydraulic fracturing system for fracturing rock in the earth formation.

6. The computer-implemented method of claim 1, wherein controlling equipment comprises controlling a production rig for producing hydrocarbons from the earth formation.

7. The computer-implemented method of claim 1, wherein the 3D grid comprises a plurality of 3D cells, and wherein each node comprises a coordinate indicating a relationship of the node with respect to one of the plurality of 3D cells.

8. The computer-implemented method of claim 7, wherein the coordinate comprises an x-axis coordinate, a y-axis coordinate, and a z-axis coordinate.

9. The computer-implemented method of claim 1, wherein the fully connected surface representation represents at least a plurality of points in a row along a projection direction.

10. The computer-implemented method of claim 1, wherein the fully connected surface representation is connected to another fully connected surface to form a water tight structural model.

11. A system for three-dimensional (3D) surface representation, the system comprising:
drilling equipment;
a memory comprising computer readable instructions; and
a processing device for executing the computer readable instructions for performing a method, the method comprising:
receiving, by the processing device, a triangle mesh surface representation of a surface of an earth formation;
defining, by the processing device, a 3D grid over the triangle mesh surface representation, wherein the 3D grid comprises cells defined by edges;
identifying, by the processing device, points of intersection as nodes that are situated on the edges;
based at least in part on two nodes being identified as situated on an edge of a first cell, connecting, by the processing device, the two nodes;
based at least in part on more than two nodes being identified as situated on an edge of a second cell, connecting, by the processing device, the more than two nodes by tracing a topology of the surface representation to determine an order in which to connect the more than two nodes;
generating, by the processing device, a fully connected surface representation of the surface of the earth formation based at least in part on the nodes and connections between the nodes; and
controlling, by the processing device, the drilling equipment based at least in part on the fully connected surface representation of the surface of the earth formation.

12. The system of claim 11, wherein identifying the points of intersection is performed by ray casting.

13. The system of claim 11, wherein the 3D grid comprises a plurality of 3D cells, and wherein each node comprises a coordinate indicating a relationship of the node with respect to one of the plurality of 3D cells, wherein the coordinate comprises an x-axis coordinate, a y-axis coordinate, and a z-axis coordinate.

14. The system of claim 11, wherein the fully connected surface representation represents at least a plurality of points in a row along a projection direction.

* * * * *